Feb. 6, 1940.  R. S. SANFORD  2,189,679
GEAR SHIFTING MECHANISM
Filed Jan. 3, 1936  3 Sheets-Sheet 1

Fig. 1.

Inventor
Roy S. Sanford
By N. W. Parker
Attorney

Feb. 6, 1940. R. S. SANFORD 2,189,679
GEAR SHIFTING MECHANISM
Filed Jan. 3, 1936 3 Sheets-Sheet 3

Inventor
Roy S. Sanford
By N. W. Parker Jr.
Attorney

Patented Feb. 6, 1940

2,189,679

UNITED STATES PATENT OFFICE 2,189,679

GEAR SHIFTING MECHANISM

Roy S. Sanford, New York, N. Y., assignor to Bendix-Westinghouse Automotive Air Brake Company, Pittsburgh, Pa., a corporation of Delaware Application January 3, 1936, Serial No. 57,410

22 Claims. (Cl. 192—3.5)

This invention relates to motor vehicle transmission control mechanisms and more particularly to a device for controlling the operation of a gear-changing transmission and for coordinately operating a vehicle clutch.

One of the objects of the present invention is to provide, in a power-operated vehicle transmission mechanism, a novel construction whereby the operator is relieved of the necessity of manually disengaging and engaging the vehicle clutch each time it is desired to effect a change in the gear ratio of the transmission.

Another object is to provide a construction of the above character wherein the engagement of the vehicle clutch is automatically effected in a gradual and efficient manner after the gear-changing operation has been completed, without further effort on the part of the operator than that required to shift the gears.

Still another object is to retain, in an arrangement of the above type, manual control of the vehicle clutch through the usual operator-controlled instrumentality.

A further object is to provide a power-operated gear-changing transmission mechanism wherein the actual engagement of the gears of the selected ratio will be effected in a cushioned or retarded manner without, however, sacrificing the time element which requires a prompt and speedy establishment of the selected gear relation.

Still another object is to provide, in a structure of the above type, a novel mechanism insuring rapid neutralization of the transmission between each shift.

A further object is to provide an efficiently operable, remotely-controlled power gear-shifting apparatus wherein the master control for selecting and establishing the desired gear relation as well as the requisite coordinate operation of the vehicle clutch is reduced to a single operator-controlled lever, and wherein the construction is such as to lend itself to ready adaptation to existing types of vehicle transmission.

A still further object is to provide, in a power-operated gear-shifting apparatus of the type having a member oscillatable to select and shiftable to establish a desired gear relation, a novel guiding device for the member whereby establishment of the selected gear relation is assured and whereby neutralization of the gear relations is greatly facilitated.

Other objects and novel features of the invention will appear more fully hereinafter from the following detailed description when taken in connection with the accompanying drawings. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views.

Figure 1:
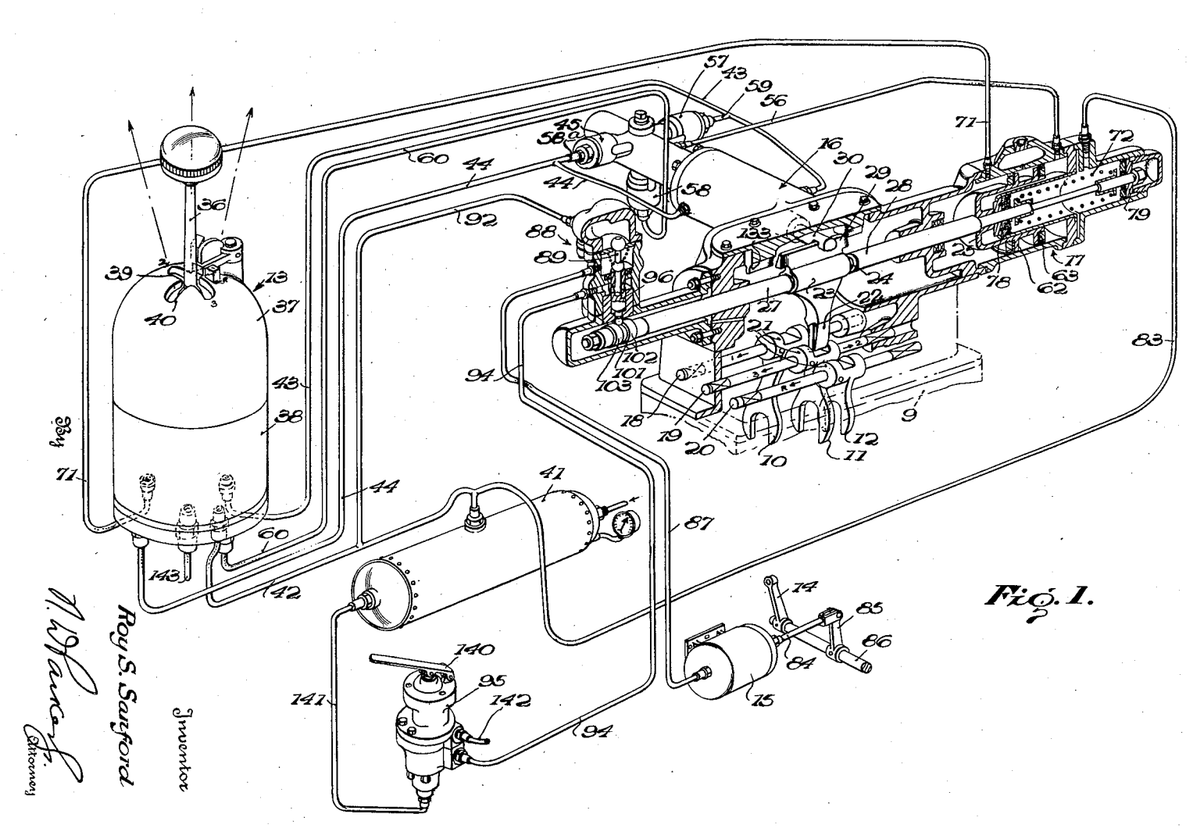
Fig. 1 is a diagrammatic view of the present invention, illustrated in perspective, certain of the parts being shown in section.

Referring more particularly to Fig. 1, a transmission-control mechanism constructed in accordance with the present invention is illustrated therein as being associated with a vehicle transmission gearing 9 of any suitable type and including shifter forks 10, 11 and 12 engaged with the transmission gears or clutches, not shown, and shiftable in the usual manner to establish a desired gear relation. In the present instance, a selection and establishment of the desired gear relation or ratio is effected through a power-operated mechanism remotely controlled through an operator-controlled unit 13, there being also provided a vehicle clutch-controlling element 14 and a fluid pressure-controlled actuator 15 therefor which is incorporated in the transmission-control system in a manner which will appear more fully hereinafter.

For the purpose of remotely effecting a selection and establishment of a desired gear relation, under the control of unit 13, the present invention provides a selecting fluid pressure actuator 16 and a shifting fluid pressure actuator 17 which are associated with the usual shifter bars 18, 19 and 20 of the vehicle transmission 9. As shown, these bars carry the shifter forks 10, 11 and 12 which are provided with the customary slotted portions 21, adapted to be selectively engaged by the lower end portion 22 of a combined selector and shift finger or member 23, the latter being slidably mounted on a piston rod 24 of a piston 25, the relative sliding movement between said finger and said piston rod being limited as by means of a pair of sleeves 27 and 28 secured to the piston rod. From this construction, it will be perceived that a slight amount of lost motion exists between the piston rod 24 and the finger 23, permitting some movement of the former prior to movement of the latter. The finger 23 is, moreover, provided with an elongated flanged extension 29 having a suitable connection with a piston rod 30 carried by a piston 31, the last named piston being associated with the selector actuator 16 while the piston 25 is associated with the shifting actuator 17.

Figures 2, 3:
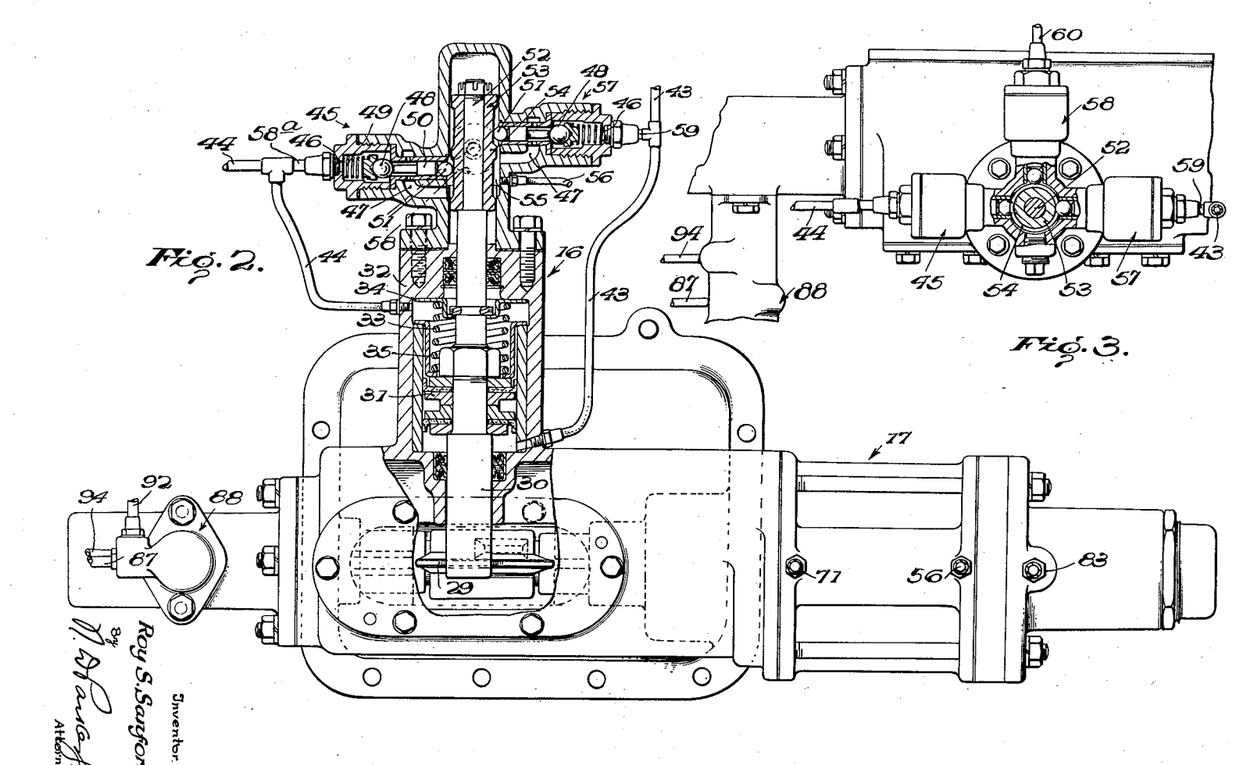
Fig. 2 is a plan view of the transmission-control mechanism, a portion of the selector power unit being shown in section.
Fig. 3 is an end view of a portion of the power-controlling mechanism, the valve-actuating structure being shown in section.

The actuator 16 is adapted to control the selecting movements of the member 23 through the connections above described, and in order to secure such control, the same is adapted to be supplied with fluid pressure from the remotely-positioned controlling device 13. The actuator 16, as shown in Fig. 2, includes a cylinder 32 housing the piston 31, and in order that the latter may be normally centered with respect to the cylinder, for the purpose of maintaining the shifting finger 23 in the neutral position shown in Fig. 1, a suitable precompressed resilient device such as spring 33 is employed, the expansion of said spring in opposite directions being limited by means of cups 34 and 35. In assembling the parts of the actuator 16, the spring 33 is placed under a slight initial compression, and from this construction, it will be readily observed that the piston 31, and hence the shifting finger 23, is resiliently maintained in a central or neutral position when fluid pressure is exhausted from both ends of the cylinder 32.

The remotely-positioned manually-operable transmission-control device 13 is located conveniently to the operator of the vehicle and is preferably constituted as disclosed in the application of Stephen Vorech, Serial No. 57,447, filed January 3, 1936, and corresponding to Patent No. 2,075,917 issued April 6, 1937. Such device includes a plurality of valve mechanisms adapted to be selectively operated as by means of a manually-operable control lever 36, movements of which are suitably guided as by means of a slotted cover 37 on a casing 38. As shown, the cover 37 is provided with right-angularly intersecting slotted portions 39 and 40, but it will be readily understood that other suitable guiding slots may be provided in the cover for controlling the selection and establishment of a desired gear relation depending upon the particular vehicle transmission utilized. In the present arrangement, movement of the control lever 36 to the left and right in slot 40 establishes first and reverse gear relations respectively, while movement of the control lever to the left and right in slot 39 establishes second and third gear relations respectively. Such movements of the control lever operate suitable control valves housed within the casing 38 for the purpose of providing fluid pressure for the actuators 16 and 17 from a reservoir 41, the latter being connected to the control unit by conduit 42.

In order to control the flow of fluid pressure to the selecting actuator 16 to effect selection of the desired shifter bar in accordance with controlling movements of the lever 36, opposite ends of the said actuator are connected to the unit 13 through conduits 43 and 44, the connections being made in such a manner that movement of the control lever 36 in the slot 40 to the left and right, as viewed in Fig. 1, will establish a flow of fluid through the conduits 44 and 43 respectively, such operation respectively effecting selection of shifter bar 19 or 20.

Associated with the selector actuator 16 is a valve mechanism for controlling the flow of fluid pressure to the shifting actuator 17 during certain desired shifting movements of the latter, such valve mechanism being employed for the purpose of insuring selection of the desired shifter bar before energization of the shifting actuator, as well as insuring neutralization of the gear relations between the establishment of successive gear ratios. Such valve mechanism employs three similar valve devices and, referring to Fig. 2, one of such devices will be referred to in detail. As shown therein, one such valve device 45 is constituted by an inlet connection 46, an outlet connection 47 and a ball valve 48, normally resiliently maintained as by means of a spring 49 in such a position as to close communication between the inlet and outlet. Actuating means for said ball valve in the nature of a plunger 50 operated through a ball 51 is provided for unseating the valve 48 in order to establish a connection between the inlet 46 and outlet 47 in response to movements of the selector actuator 16. As shown, the piston rod 30 of the latter is provided with a reduced portion 52 carrying a valve-actuating member 53 provided with a circular cam 54. This cam is so constituted, as will appear from Fig. 2, that the same will contact the ball 51 during downward movement of the piston 31 in order to actuate the valve 48. Fluid pressure may thus be conducted through the outlet 47 to a chamber 55 formed by the member 53, which chamber is in constant communication with the shifting actuator 17 through a conduit 56. As will appear from Figs. 2 and 3, in addition to the valve device 45, similar valve devices 57 and 58 are provided, the latter valve being actuated by the cam 54 when the parts are in the neutral position shown in Fig. 2, while valve devices 45 and 57 are not operated except when the piston 31 is moved up or down sufficiently to enable cam 54 to engage balls 51.

As will be readily perceived from Figs. 1, 2 and 3, the conduit 44 which supplies fluid pressure from the control unit to the selector actuator 16 is provided with a branch conduit 58a which supplies fluid pressure to the intake 46 of valve device 45. Similarly, the conduit 43 which supplies fluid pressure to the opposite end of the actuator 16 is provided with a branch conduit 59 for conducting fluid pressure to the inlet 46 of valve device 57. Valve device 58 is supplied with fluid pressure from the control device 13 directly through conduit 60.

From the above described construction, it will be readily understood that in the event the control lever 36 is moved to the left-hand extremity of slot 40, fluid pressure is conducted through conduit 44 to the upper end of actuator 16, as viewed in Fig. 2, and the piston 31 thereof will be moved downwardly in order to effect selection of the shifter bar 18 through the portion 21 of the shifter fork 10. Fluid under pressure will not be conducted to the shifting actuator 17, however, until the aforesaid selection is made and the valve-actuating member 53 has moved to engage cam 54 with the valve device 45 and has unseated the valve 48 thereof. This latter operation will serve to connect conduits 44 and 56 through the branch conduit 58a and the chamber 55 in order to conduct fluid pressure to the right-hand portion of actuator 17, as viewed in Fig. 1. Movement of the control lever 36 to the right-hand extremity of slot 40 will, on the other hand, connect reservoir 41 to the conduit 43, and fluid under pressure will thus be conducted to the lower end of the actuator 16, as viewed in Fig. 2, in order to effect upward movement of the piston 31 and consequent selection of the shifter bar 20 through oscillation of the combined selector and shifter member 23.

Here again, however, fluid pressure will not be conducted to the shifting actuator 17 until the valve-actuating member 53 has moved sufficiently to open the valve 48 associated with valve device 57 through cooperation between cam 54 and ball 51. When this latter operation occurs, it will be readily understood that conduits 43 and 56 will be connected through the branch conduit 59 and chamber 55. As above stated, the aforesaid movements of the selector actuator, respectively selecting the shifter bars 18 and 20, are responsive to the movement of the control lever 36 to the left and right in slot 40. Upon subsequent operation of the shifting actuator 17, as will be more particularly pointed out hereinafter, shifting movements of the selected shifter bars 18 and 20 are effected in order to establish first or reverse gear relation without further operation of the control lever.

Figures 4, 5, 6:
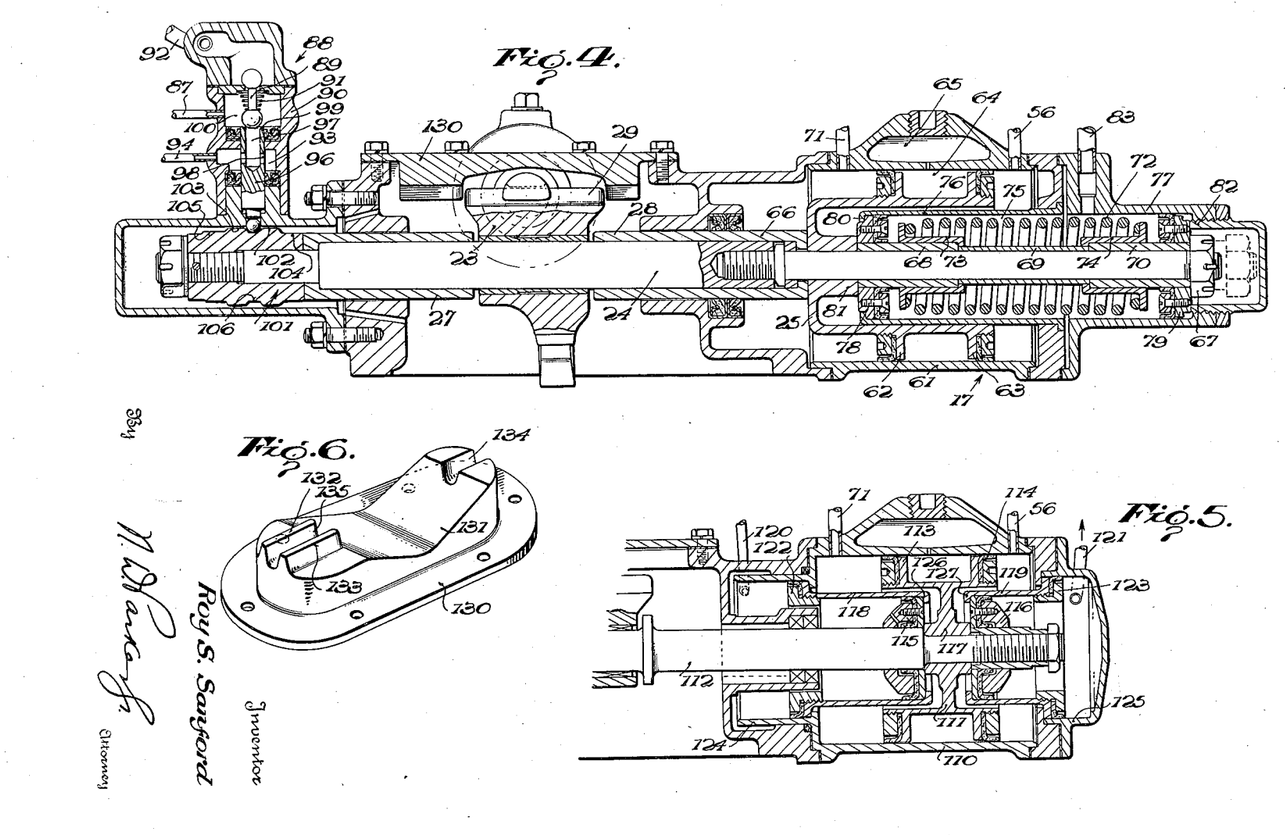
Fig. 4 is a longitudinal sectional view of the power-controlling mechanism illustrating the shifting power unit as well as the clutch-controlling valve mechanism operated thereby.
Fig. 5 is an axial sectional view of a modified form of shifting power unit.
Fig. 6 is a perspective view of the guide of the combined selector and shifter member.

The shifting actuator 17, referring more particularly to Fig. 4, is constituted by a cylinder 61 housing the piston 25, which latter, in the form of the invention illustrated, is constituted by a pair of spaced-apart piston heads 62 and 63, the space 64 therebetween being adapted to be supplied with a suitable lubricant from a reservoir 65. The piston 25 is adapted to impart movement to the piston rod 24 in one direction through sleeve 28 and in the other direction through a nut 67, there being interposed between the piston and the nut a plurality of sleeves 68, 69 and 70. In addition to the conduit 56 which communicates with the right-hand portion of the actuator 17, the latter is provided with a conduit connection 71 which is directly connected with the control unit 13 and is supplied with fluid pressure upon movement of the control lever 36 to the left-hand extremity of slot 39, this movement serving to establish second gear relation through movement of the piston 25 and shifter bar 19 to the right, as viewed in Fig. 1. Third gear relation is established by supplying fluid pressure through conduit 56 to the right-hand portion of the shifting actuator 17.

One of the features of the present invention resides in the provision of a construction for cushioning or retarding the movement of the shifter actuator at a time when the gear relation is about to be established, such construction avoiding the undue stresses and strains which might otherwise occur in establishing a gear ratio by means of power mechanism. In the form of the invention illustrated in Fig. 4, the construction affording this desirable result is resilient in nature and comprises a precompressed spring 72 which is confined between a pair of cups 73 and 74, the engagement between the latter and sleeves 68 and 70 serving to limit the expansive force of the spring 72. The latter is housed within a cylinder 75 formed by a member 76 and an extension 77, the cylinder 75 containing pistons 78 and 79 which are respectively slidably mounted upon the sleeves 68 and 70. As illustrated in Fig. 4, the piston 78 abuts a flange 80 of member 76 as well as hub 81 of the piston 25, while piston 79 abuts the nut 67 and the inner end of a cap 82. The pistons 78 and 79 are normally maintained in this position as by means of fluid pressure conducted to the cylinder 75 directly from the reservoir 41 through a conduit 83, this construction forming not only a part of the cushioning means but also an advantageous structure for automatically neutralizing the gear relations.

It will readily appear from Fig. 4 and the foregoing description that fluid pressure conducted to the shifting actuator 17 through conduit 71 will effect a rapid movement of pistons 25 and 78 in unison until the cup 74 contacts piston 79. Continued movement of the piston 25 and piston 78 will continue but at a reduced rate due to the force required to compress the spring 72, it being appreciated that during this cushioning movement of the piston 25, sleeve 69 will move relatively to the cup 74. Upon release of fluid pressure from the actuator, the spring 72 will tend to rapidly return the parts to neutral position. This neutralization will be aided and completed by the fluid pressure within cylinder 75 which constantly tends to force the piston 78 to the end of cylinder 75.

In order to relieve the operator of the necessity of manual operation of the vehicle clutch during gear-shifting operation of the mechanism hereinbefore described, the present invention utilizes a slight movement of the shifter piston rod prior to actual shifting movement of the selected shifter bar to automatically control the vehicle clutch in such a manner that the latter is completely disengaged prior to any movement of the selected shifter bar. The construction is also such that after establishment of the desired gear relation, the clutch is automatically permitted to engage, through the action of its associated return spring, in a gradual and efficient manner, such arrangement completely avoiding any necessity on the part of the operator for manually controlling the vehicle clutch. This arrangement is, moreover, so constituted that manual control of the vehicle clutch may be exercised as heretofore. To this end, see Figs. 1 and 4, the vehicle clutch-controlling member 14 is adapted to be actuated by means of the fluid pressure actuator 15 through connections 84, 85 and 86, said actuator being adapted to be supplied with fluid pressure through conduit 87 by means of a valve mechanism 88. The latter includes a combined inlet and exhaust valve member 89 mounted within a casing 90 and normally urged as by a spring 91 to close off communication between conduits 92 and 87. The casing 90 is provided with an exhaust chamber 93 which, in the present instance, is connected through a conduit 94 to a manually-operated clutch-controlling valve 95 for a purpose which will appear more fully hereinafter. Slidably mounted within the casing 90 is a valve-actuating element 96 which is formed with a hollow bore 97 communicating with the chamber 93 through ports 98. The upper end of the element 96 is formed as an exhaust valve seat 99 which is normally spaced from the valve 89 but which, upon upward movement, is adapted to engage said valve to close off communication between chamber 100 and chamber 93 and to establish communication between the chamber 100 and the conduit 92. Such upward movement of the element 96 is effected by means of a cam member 101, secured to piston rod 24 and formed with cams 102 and 103. With such an arrangement, movement of the piston rod 24 in either direction will effect valve-operating movement of the element 96 through cams 102 or 103. In either case, communication between chambers 93, 100 will be cut off and fluid pressure conducted from conduit 92 to the actuator 15 through conduit 87. Continued movement of the piston rod 24 in order to establish the selected gear relation will serve to align the portions 104 or 105 of the cam element 101 with the element 96 whereupon the valve 89 will be returned to the position indicated in Fig. 4, it being pointed out that this operation takes place after the gear relation has been established. In the neutral position shown in this figure, the element 96 is aligned with the reduced cam 106 which permits communication between the clutch actuator 15 and the exhaust chamber 93 of the valve in order to permit engaging movement of the clutch-controlling member 14 in a manner which will be described hereinafter.

A slightly modified form of shifting actuator employing fluid pressure-operated means for cushioning the gear-engaging movement of the actuator is shown in Fig. 5 and includes a cylinder 110 having a piston 111 slidably mounted therein. The piston is secured to a piston rod 112 and is provided with oppositely-disposed heads 113 and 114, the cylinder being provided with the fluid conduits 71 and 56. As in the instance of the shifting actuator 17, fluid pressure supplied cylinder 110 through conduits 56 or 71 will respectively effect movement of the piston 111 to the left and right of the cylinder.

In order to provide the modified form of actuator with fluid pressure-operated neutralizing means, a pair of neutralizing pistons 115 and 116 are disposed upon either side of the piston 111 and, in the position indicated in Fig. 5, are in contact with a hub portion 117 of the piston 111, the pistons 115 and 116 being respectively housed within cylinders 118 and 119. The latter cylinders are subjected at all times to reservoir pressure through conduits 120 and 121 so that the pistons 115 and 116 are constantly urged to the central neutral position indicated in Fig. 5.

As heretofore stated, one of the features of the modified form of shifting actuator resides in the utilization of fluid pressure-operated cushioning mechanism. To this end, the cylinders 118 and 119 are formed with piston heads 122 and 123 respectively slidable in cylinders 124 and 125, said latter cylinders being in constant communication with cylinders 118 and 119 respectively. As clearly indicated in Fig. 5, the cylinders 118 and 119 are so formed adjacent the piston 111 as to provide flanges 126 and 127 which are engageable by the hub portion 117 of the piston 111 after a predetermined degree of movement of the latter has taken place.

It will be readily apparent from the foregoing description of the structure of Fig. 5 that movement of the piston 111 in either direction in response to the application of fluid pressure to cylinder 110 will simultaneously move either the piston 115 or 116. Continued movement of these pistons takes place until the piston 111 has moved sufficiently to engage either of the flanges 126 or 127. At this point in the travel of the piston 111, the gear relation is about to be established and further movement of the piston will serve to effect movement of either of the cylinders 118 or 119. Since each of the latter is formed as a piston, of larger cross-sectional area than the pistons 115 or 116 and of smaller cross-sectional area than piston heads 113 or 114, and is subjected to reservoir pressure, it will be readily understood that continued movement of the piston 111 to effect gear-establishing relation will be cushioned or retarded. Release of fluid pressure from the cylinder 110 will enable the neutralizing pistons 115 or 116 to promptly return the shifter piston 111 to the central neutral position indicated.

Since the selector actuator of the present invention tends to be resiliently centered whenever fluid pressure is exhausted therefrom, it is possible that the selector finger 23 will be frictionally engaged with one of the heads 21 of the shifter forks during a change from one gear relation to another, more particularly when fluid is exhausted from the selector actuator and the shifting actuator is still returning the shifting finger 23 to neutral position. In order to eliminate the possibility of such friction between the selector finger and the shifter forks, as well as to positively prevent any oscillation whatsoever of the shifter finger when the latter is not in neutral position, a guide is associated with the shifter finger and is so constituted as to effect the above desirable results. As shown more particularly in Figs. 4 and 6, said guide is constituted by a cover plate 130 having a recessed portion 131 for reception of the flanged portion 29 of the shifter finger, as indicated in Fig. 4, this recessed portion enabling oscillation of the selector member 23 when the shifting actuator 17 is in neutral position. Upon either side of the recessed portion 131, the guide is formed with a suitable tooth and slot arrangement adapted to coact with the flange 29 and positively guide the shifting finger during actuation of the shifting actuator. In the form shown, teeth 132 and 133 are provided at one end of the guide while the other end is provided with a slot 134. The space between teeth 132 and 133 defines a slot 135 which is aligned with the slot 134. These slots permit guiding reciprocating movement of the shifting actuator 17 in order to effect operation of the shifter bar 19 in either direction. Since, in the present invention, the shifter bars 18 and 20 are only shifted to the left, as viewed in Fig. 4, the teeth 132 and 133 form a sufficient guide for the shifter member during shifting movement of these bars. For example, in the event that shifter bar 20 is selected, the flange 29 of the shifter member 23 is guided by the outer face of tooth 133. In the event of selection of shifter bar 18, the shifter finger is guided by the outer face of tooth 132. It is to be pointed out that the ends of the teeth 132 and 133 adjacent the recessed portion 131 are rounded for cooperation with the rounded end of flange 129 in order to facilitate the neutralization of the shifter member 23 as the shifter piston withdraws the shifter member from guiding engagement with the teeth 132 and 133. This construction results in a camming action between the flange 129 and the teeth 132, 133 under the action of the centering spring of the selector actuator, which assures neutralization of the shifter member.

During the automatic operation of the vehicle clutch-controlling member 14 when the shifting actuator 17 is moved, it has heretofore been pointed out that the valve 88 exhausts the clutch actuator 15 directly through the manually-operable clutch-controlling valve 95 by way of conduit 94. Such manually-operable valve is provided with an operator-controlled pedal 140 and serves when operated to convey fluid pressure through the same line 94 to the clutch actuator 15 through valve 88, the fluid passing from reservoir 41 to the valve 95 through conduit 141. The last named valve, which may be constructed as disclosed in the application of Andres and Sanford, Serial No. 57,411, filed January 3, 1936 corresponding to Patent No. 2,133,275 issued October 18, 1938, is provided with an atmospheric exhaust port 142 and the parts of the valve are so adjusted that this exhaust port is restricted when the valve 95 is in normal position. Such restriction permits a gradual exhausting of the fluid from the clutch actuator 15 when the automatically-operable valve 88 is actuated and this permits a gradual engagement of the clutch without the necessity of manual manipulation of the valve 95. The common conduit 94 for exhausting the valve 88 and for admitting fluid to the clutch actuator when valve 95 is actuated, dispenses with the necessity of providing separate actuators for the clutch-controlling member or providing a double-check valve arrangement whereby the two valves 95 and 88 could supply a single actuator with fluid pressure from a common source, as has heretofore been necessary.

In operation, assuming that the parts occupy the neutral position indicated on the drawings, movement of the control lever 36 to the left-hand extremity of slot 40 serves to admit fluid pressure from the reservoir 41 to the selector actuator 16 through conduits 42 and 44. Movement of the piston 31 in the actuator 16 responsive to the fluid pressure conducted thereto will effect oscillating movement of the selector finger 23 to cause the lower portion 22 thereof to select the shifter bar 18 through engagement of portion 22 with the slot 21 of the shifter fork 10. Coordinately with the selection of bar 18, referring to Fig. 2, the valve 45 controlling the flow of fluid pressure to the shifting actuator 17 will be operated by the valve-actuating member 53 connected with the selector piston 31, and fluid pressure will be conducted through said valve to the right-hand portion of the shifting actuator 17 via chamber 55 and conduit 56, the fluid pressure so conducted being exerted against piston 25 in order to move piston rod 24, member 23 and shifter bar 18 to the left, as viewed in Fig. 1, to establish first gear relation.

It will be noted, however, that in view of the fact that member 23 is connected to the piston rod 24 through a lost motion connection, the initial movement of the piston rod will not effect movement of the selector member until a predetermined degree of movement of the piston rod 24 has been effected, such predetermined movement being defined by the position of sleeves 27 and 28 upon the piston rod 24. During this free movement of the piston rod, the valve-actuating element 96 is cammed upwardly to effect operation of the valve 88 in order to supply fluid pressure to the clutch actuator 15 by way of conduits 92 and 87. As heretofore described, this action will cause a clutch-disengaging movement of the clutch-controlling member 14, thus insuring disengagement of the vehicle clutch prior to shifting movement of the member 23 and shifter bar 18 selected thereby.

As heretofore pointed out, checking or cushioning means is associated with the shifting actuator 17 in order to retard that portion of the movement of the actuator when a gear relation is about to be effected. Referring to Fig. 4, as soon as the shifting actuator piston 25 and piston rod 24 have been moved a sufficient distance to the left as to bring cup 73 into engagement with piston 78, further movement of the piston assembly will serve to compress the preloaded spring 72. The remainder of the stroke of the piston assembly will thus be retarded or checked, thus insuring that actual engagement of the selected transmission gears will be effected in a quiet and efficient manner. It will be observed that the above construction is such that the retarding means constituted by the spring 72 does not influence the stroke of the piston assembly until the gear relation is about to be established. In other words, the initial movement of the piston assembly takes place in a rapid manner under the influence of the pressure of the fluid exerted against the piston 25 and thus the gear relation is established as rapidly as possible, consistent with efficient operation and elimination of gear clashing.

Adjacent the limit of the stroke of the shifter piston 25 and after the engagement of the selected transmission gears has been effected, the valve-actuating element 96, see Figs. 1 and 4, becomes aligned with the cam portion 104. When this occurs, the valve 89 is moved to closed position through the action of spring 91, and conduit 87 is connected to the exhaust chamber 93 through ducts 97 and 98. Since the exhaust chamber 93 is in constant communication with the outlet chamber of valve 95, which latter is restrictedly connected to the atmospheric exhaust 142, fluid pressure from the clutch actuator 15 will be exhausted and the vehicle clutch will be gradually returned to engaged position, smoothly and efficiently under the action of the usual clutch-return springs.

In the event that it is now desired to establish the second gear relation, the control lever 36 is returned to the neutral position indicated in Fig. 1 and promptly moved to the left-hand extremity of slot 39. As soon as the control lever 36 reaches the neutral position, however, the valve of the control device 13, previously operated by the control lever to establish first gear relation, is exhausted to atmosphere through an exhaust conduit 143 common to all of the valves of the control device 13. When this occurs, the selector actuator 16 is exhausted through conduit 44 and the neutralizing spring 33 associated with said actuator promptly tends to move the piston 31 and selector finger 23 to neutral position. This is prevented at this particular instant, however, by means of the cooperation between the flange 29 of the selector finger and the guide tooth 132 of the guide 130. With the exhausting of conduit 44, the shifting actuator 17 is also exhausted through conduit 56, chamber 55 and open valve 45. The neutralizing piston 79, associated with the shifter actuator piston rod 24 and being constantly subjected to fluid pressure through conduit 83, then promptly moves the shifter actuator to neutral position and the selector member 23 is returned to neutral through the combined action of the inertia of said member and the spring 33 of the selector actuator 16, the neutralizing of the selector finger being facilitated through the cooperation of the rounded ends of tooth 132 and flange 29.

It will be noted, however, that the initial movement of the shifter piston rod 24 in returning to neutral will effect operation of the valve 88 through the cam 102 to effect disengaging movement of the clutch-controlling member 14 in a manner heretofore described. This disengagement of the vehicle clutch facilitates the disentablishment of the first gear relation. It will also be perceived that when neutralization has been completed, the vehicle-controlling member will be reengaged by reason of the exhausting of the valve 88, the latter being moved to such position as soon as cam 106 has become aligned with the valve plunger 96.

When the neutralizing operation above described has been completed and all of the parts including valve 45 controlled by the selector piston 31 have been returned to the position shown in the drawings, fluid pressure will be conducted directly to the left-hand portion of the shifter actuator 17 through conduit 71, this being due to the operation of the valve controlled by the movement of the control lever 36 to the second gear position. Fluid pressure being thus exerted against the shifter piston 25 will move the latter, shifter finger 23 and shifter bar 19 to the right, as viewed in Fig. 1, in order to establish second gear relation. During the initial movement of the shifter piston, the vehicle clutch is disengaged as heretofore described and thereafter the gear relation is established, the same being checked by the functioning of the cushioning spring 72.

Third gear relation is established by movement of the control lever to the right-hand extremity of slot 39, as viewed in Fig. 1, which causes shifting movement of the shifter bar 19 to the left, as viewed in said figure. During establishment of the third gear relation, no movement of the selector piston 31 takes place and fluid pressure is conducted directly to the right-hand portion of the shifter actuator through the valve 58, maintained in open position by cam 54 when the selector piston is in central position.

Selection and establishment of reverse gear relation is effected through movement of the control lever 36 to the right-hand extremity of slot 40, such movement establishing sequential selection of the shifter bar 20 and shifting of the latter to the left, as viewed in Fig. 1. Fluid pressure under these conditions is conducted to the shifting actuator 17 through operation of valve 57, effected by movement of the selector piston 31 to the left, as viewed in said figure.

There is thus provided by the present invention a remotely-controlled power-operated gear-shifting mechanism which is so constructed as to be efficient and positive in operation and which dispenses with the necessity of the exertion of any manual effort on the part of the operator other than the movement of a gear-selecting lever to one of a plurality of positions. The selection and establishment of the desired gear relation is thereafter automatically effected by means of the mechanism herein described in detail and the vehicle clutch is automatically disengaged and engaged coordinately with the shifting of the gears. While the entire operation is automatic, even to the extent of operation of the vehicle clutch, yet the invention is so constructed that manual control of the vehicle clutch may be exercised in a manner similar to standard practice. The interconnection between the automatically-operated clutch control valve and the manually-operable clutch control valve is such as to avoid the necessity of employing additional clutch actuators or check valves, thus simplifying the arrangements heretofore utilized.

It may also be advantageously pointed out here that the provision of the guide for the combined selector and shifter member not only results in the elimination of friction between the said member and shifter forks but also greatly facilitates the neutralization of the said member. Such neutralization, it will be understood, is effected in a positive manner through the utilization of the fluid pressure-controlled means disclosed herein, and establishment of the gear relation selected through operation of the control lever is assured by such prompt neutralization of the gear relations intermediate each shift.

While two modifications of the invention have been shown and described herein, it is to be understood that the same is not limited thereto but may be embodied in various forms, as well understood by those skilled in the art. It will be furthermore understood that certain parts may be used without others if desired, without departing from the spirit of the invention. Reference will therefore be had to the appended claims for a definition of the limits of the invention.

What is claimed is:

1. In combination with a vehicle clutch-controlling member and a shiftable transmission gear-changing element, a fluid motor for actuating said member, valvular means operable by initial movement of said element from neutral position for controlling the flow of energizing fluid to said motor and separate manually-controlled valvular means operable to supply energizing fluid to said motor through said first named valvular means.

2. In combination with a vehicle clutch-controlling member and a shiftable transmission gear-changing element, a fluid motor for actuating said member, valvular means operable in one direction by movement of said element from neutral position to admit energizing fluid to said motor and movable in another direction to exhaust said fluid, a separate valvular means for automatically controlling said exhaust of fluid, and manually-operable means for operating said separate valvular means to supply energizing fluid to said motor.

3. In combination with a vehicle clutch-controlling member and a shiftable transmission gear-changing element, a fluid motor for actuating said member, valvular means operable in one direction by movement of said element from neutral position to admit energizing fluid to said motor and movable in another direction to exhaust said fluid, a separate valvular means for automatically controlling said exhaust of fluid, and manually-operable means for operating said separate valvular means to supply energizing fluid to said motor through said first named valvular means.

4. In combination with a vehicle clutch-controlling member and a power-operated gear-changing element, a fluid motor for actuating said member, means for controlling the application of power to said element, valvular means operable by said element upon initial movement thereof from neutral position to supply said motor with actuating fluid, and separate manually-controlled means for supplying said motor with actuating fluid through said first named valvular means.

5. In combination with a vehicle clutch-controlling member and a power-operated gear-changing element, a fluid motor for actuating said member, means for controlling the application of power to said element, valvular means operable by said element upon initial movement thereof to supply said motor with actuating fluid, said valvular means including inlet, outlet and exhaust connections, a separate manually-operable valve having inlet, outlet and exhaust connections, said inlet being connected with a source of actuating fluid, and means connecting the exhaust connection of said first valvular means to the outlet of said second valvular means whereby fluid exhausted from said first valvular means is conducted to said second valvular means and the latter is operable to supply actuating fluid to said motor through said first valvular means.

6. The combination with a shifter bar of an automotive vehicle transmission gearing, of a fluid pressure-operated device for effecting shifting movement of said bar in opposite directions to establish either of a pair of gear ratios, means for admitting fluid pressure to said device to effect shifting movement of the latter in either of said opposite directions, and means including fluid pressure-responsive elements operable only after a portion of the said movements has been completed for checking the remaining portions of the movements in order to cushion the establishment of the selected gear ratio, said elements being subjected at all times to fluid pressure and serving to return said device and bar to neutral position when fluid pressure to said device is relieved.

7. The combination with a shifter bar of an automotive vehicle transmission gearing, of a fluid pressure-operated device for effecting shifting movement of said bar in opposite directions to establish either of a pair of gear ratios, means for admitting fluid pressure to said device to effect shifting movement of the latter in either of said opposite directions, and means operable only after a portion of the said movements has been completed for checking the remaining portions of the movements in order to cushion the establishment of the selected gear ratio, said last named means including pressure-responsive means carried by said device, subjected at all times to fluid pressure and serving to return said device and bar to neutral position when fluid pressure to said device is relieved.

8. The combination with a shifter bar of an automotive vehicle transmission gearing, of a fluid pressure-operated device for effecting shifting movement of said bar in opposite directions to establish either of a pair of gear ratios, means for admitting fluid pressure to said device to effect shifting movement of the latter in either of said opposite directions, and means including fluid pressure-responsive elements subjected at all times to fluid pressure for returning said device and bar to neutral position when fluid pressure to said device is relieved.

9. The combination with a shifter bar of an automotive vehicle transmission gearing, of a fluid pressure-operated device for effecting shifting movement of said bar in opposite directions to establish either of a pair of gear ratios, means for admitting fluid pressure to said device to effect shifting movement of the latter in either of said opposite directions, and means including fluid pressure-responsive elements subjected at all times to fluid pressure and operatively connected with said device for returning the latter and bar to neutral position when fluid pressure to said device is relieved, said pressure-responsive elements being of less cross-sectional area than said device.

10. In a control mechanism for a vehicle gear-shifting apparatus having a selector and shifting member normally occupying a neutral position, means for mounting said member adjacent said apparatus, a fluid-operated motor for oscillating said member to select a desired gear ratio, a second fluid-operated motor for shifting said member for establishing the selected gear ratio, means to control the admission and exhaust of energizing fluid to and from said second motor, and means subjected at all times to fluid pressure for moving said second motor and member to neutral position when fluid is exhausted from said last named motor.

11. The combination with a shifter bar of an automotive vehicle transmission gearing, of a power-operated device for effecting shifting movement of said bar in opposite directions to establish either of a pair of selected gear ratios, and retarding means engageable by said device only after sufficient movement of the device and bar has taken place that the gear relation is about to be established, said retarding means being movable by said device throughout the remainder of the stroke thereof whereby establishment of the gear relation will be cushioned.

12. The combination with a shifter bar of an automotive vehicle transmission gearing, of a power-operated device for effecting shifting movement of said bar in opposite directions to establish either of a pair of selected gear ratios, and retarding means engageable by said device only after sufficient movement of the device and bar has taken place that the gear relation is about to be established, said retarding means being subjected at all times to fluid pressure and being movable by said device throughout the remainder of the stroke thereof whereby establishment of the gear relation will be cushioned.

13. The combination with a plurality of shifter bars of an automotive vehicle transmission gearing, of a control mechanism therefor comprising a pressure-operated device for selecting a desired shifter bar, means including a double-acting pressure-responsive member movable in opposite directions from a neutral position for moving said selected bar to establish the desired gear relation, means for supplying fluid pressure to said first named means, means axially aligned with said member for cushioning a portion of the gear-establishing movement of the latter, and means subjected at all times to fluid pressure for effecting a return of said member and selected bar to neutral position upon exhausting of fluid pressure from said first named means.

14. The combination with a shifter bar of an automotive vehicle transmission gearing, of a power-operated device for effecting shifting movement of said bar in opposite directions to establish either of a pair of selected gear ratios, and retarding means engageable by said device only after sufficient movement of the device and bar has taken place that the gear relation is about to be established for decreasing the rate of movement of said device throughout the gear-engaging portion of its stroke.

15. In a power-operated gear-shifting transmission having a plurality of shifter bars movable to establish a desired gear relation, a housing in which said bars are shiftably mounted, a combined selector and shifter member, means for mounting said member entirely within said housing for oscillating selecting movement and bodily shifting movement whereby one of said bars may be selected and shifted to establish a desired gear relation, said member being formed with a flanged extension, means for normally maintaining said member in neutral position, means carried by said housing and having a plurality of guides thereon for positively guiding the shifting movements of said member through cooperation between said extension and guides, and means for effecting said oscillating movement of said member including an element connected with said flanged extension.

16. In combination with a vehicle clutch-controlling member and a shiftable transmission gear-changing element, a fluid motor for actuating said member, a reservoir of fluid pressure, valvular means operable by initial movement of said element in either of opposite directions from neutral position for controlling the flow of fluid pressure from said reservoir to said motor, and separate manually-controlled valvular means operable to supply fluid pressure from said reservoir to said motor through said first named valvular means.

17. In combination with a vehicle clutch-controlling member and a shiftable transmission gear-changing element a fluid motor for actuating said member, a reservoir of fluid pressure, valvular means operable by initial movement of said element in either of opposite directions from neutral position for controlling the flow of fluid pressure from said reservoir to said motor, and means for restricting the exhaust of fluid pressure from said valvular means, said restricting means including a separate manually-controlled valvular means constructed and arranged to supply fluid pressure from said reservoir to said motor.

18. In combination with a vehicle clutch-controlling member and a gear-changing element, a fluid motor for actuating said member, valvular means operable by said element upon initial movement thereof to supply said motor with actuating fluid, said valvular means including inlet, outlet and exhaust connections, a separate manually-operable valve having inlet, outlet and exhaust connections, said inlet being connected with a source of actuating fluid, and means connecting the exhaust connection of said first valvular means to the outlet of said second valvular means whereby fluid exhausted from said first valvular means is conducted to said second valvular means and the latter is operable to supply actuating fluid to said motor through said first valvular means.

19. In combination with a vehicle clutch controlling member and a transmission having a shiftable gear changing element movable in opposite directions to establish a desired gear ratio, a fluid motor for actuating said member, valve means for controlling the application of fluid pressure to said motor, said valve means having inlet, outlet and exhaust connections, means to operate said valve means by said element during shifting movement of the latter in establishing a desired gear relation, separate valve means having inlet, outlet and exhaust connections, said inlet being adapted to be connected with a source of fluid, and means connecting the exhaust connection of said first valve means to the outlet of the second valve means whereby fluid exhausted from said first valve means is conducted to said second valve means and the latter, when operated, supplies fluid to said motor through the first valve means.

20. In combination with a vehicle clutch-controlling member and a shiftable transmission gear-changing element, a fluid motor for actuating said member, valvular means operable in one direction by movement of said element from neutral position to admit energizing fluid to said motor and movable in another direction to exhaust said fluid, a separate valvular means for automatically controlling said exhaust of fluid, and means for operating said second valvular means to supply energizing fluid to said motor.

21. In combination with a vehicle clutch-controlling member and a shiftable transmission gear-changing element, a fluid motor for actuating said member, valvular means operable in one direction by movement of said element from neutral position to admit energizing fluid to said motor and movable in another direction to exhaust said fluid, a separate valvular means for automatically controlling said exhaust of fluid, and means for operating said second valvular means to supply energizing fluid to said motor through said first named valvular means.

22. In combination with a vehicle clutch-controlling member and a gear-changing element movable in opposite directions from a neutral position, a fluid motor for actuating said member, valve means operable by said element upon initial movement thereof from said neutral position to supply fluid to said motor, said valve means including an exhaust connection, a separate valve means provided with an exhaust connection and having an outlet connected with the exhaust connection of said first named valve means, and means for operating said separate valve means to supply fluid to the exhaust connection of said first named valve means, the latter valve means being constructed and arranged to conduct the fluid supplied to the exhaust connection thereof by the separate valve means to said motor when the gear-changing element is in neutral position.

ROY S. SANFORD.